United States Patent
Nitta et al.

(10) Patent No.: US 8,846,180 B2
(45) Date of Patent: Sep. 30, 2014

(54) RETARDATION FILM

(75) Inventors: Hideaki Nitta, Chiyoda-ku (JP); Junichi Shibata, Chiyoda-ku (JP); Atsushi Sasaki, Chiyoda-ku (JP); Masahiro Murakami, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 809 days.

(21) Appl. No.: 13/128,091

(22) PCT Filed: Nov. 6, 2009

(86) PCT No.: PCT/JP2009/069307
§ 371 (c)(1),
(2), (4) Date: May 6, 2011

(87) PCT Pub. No.: WO2010/053212
PCT Pub. Date: May 14, 2010

(65) Prior Publication Data
US 2011/0212302 A1    Sep. 1, 2011

(30) Foreign Application Priority Data
Nov. 7, 2008    (JP) .................. 2008-286684

(51) Int. Cl.
| | | |
|---|---|---|
| B32B 3/00 | (2006.01) | |
| B29C 47/88 | (2006.01) | |
| G02B 5/30 | (2006.01) | |
| B29C 55/06 | (2006.01) | |
| B29K 69/00 | (2006.01) | |

(52) U.S. Cl.
CPC .......... G02B 5/3083 (2013.01); *B29K 2069/00* (2013.01); *B29K 2995/0032* (2013.01); B29C 55/06 (2013.01)
USPC ..................................... 428/156; 264/211.12

(58) Field of Classification Search
CPC ...... B29C 47/88; B29C 41/28; B29C 55/085; B29C 2947/92647; B29C 2947/92695; B32B 27/00; B29K 2069/00; C09K 19/00; C08J 2369/00; C08J 5/18; G11B 7/252; G11B 7/2534; B29L 2011/00; B29L 2031/3475

USPC ................................ 428/1.1, 156; 264/211.12
See application file for complete search history.

(56) References Cited

U.S. PATENT DOCUMENTS

| | | |
|---|---|---|
| 5,543,948 A | 8/1996 | Takahashi et al. |
| 2006/0023143 A1 | 2/2006 | Lee |

(Continued)

FOREIGN PATENT DOCUMENTS

| | | |
|---|---|---|
| EP | 1 517 163 | 3/2005 |
| JP | 2612196 | 2/1997 |

(Continued)

OTHER PUBLICATIONS

Form PCT/IB/338 dated Jun. 30, 2011 together with International Preliminary Report on Patentability including translation of PCT Written Opinion in corresponding International (PCT) Application No. PCT/JP2009/069307.

(Continued)

*Primary Examiner* — Catherine A Simone
(74) *Attorney, Agent, or Firm* — Wenderoth, Lind & Ponack, L.L.P.

(57) ABSTRACT

A retardation film which has few foreign matter defects and small retardation nonuniformity and meets the required quality of a retardation film is provided with high productivity at a low cost by melt extruding a polycarbonate.
The retardation film obtained by stretching and orienting a melt extruded film of a polycarbonate is characterized in that:
(1) the polycarbonate constituting the film has a viscosity average molecular weight of $1.3 \times 10^4$ to $1.8 \times 10^4$;
(2) the retardation R(589) within the plane of the film measured at a wavelength of 589 nm is 50 to 800 nm;
(3) the retardation R(589) nonuniformity within the plane of the film is ±5 nm;
(4) the average thickness of the film is 10 to 150 μm; and
(5) the number of film defects as large as 100 μm or more is 2 or less/m².

12 Claims, 1 Drawing Sheet

(56) References Cited

U.S. PATENT DOCUMENTS

2007/0035830 A1 2/2007 Matveev et al.
2007/0134446 A1* 6/2007 Inagaki et al. ............... 428/1.31
2009/0186168 A1 7/2009 Nitta et al.

FOREIGN PATENT DOCUMENTS

| JP | 9-239812 | 9/1997 |
| JP | 2841376 | 10/1998 |
| JP | 11-183717 | 7/1999 |
| JP | 3203069 | 6/2001 |
| JP | 3273046 | 1/2002 |
| JP | 3407714 | 3/2003 |
| JP | 2003-279733 | 10/2003 |
| JP | 2006-039545 | 2/2006 |
| JP | 2008-052170 | 3/2008 |
| WO | 2007/008777 | 1/2007 |
| WO | 2007/141899 | 12/2007 |

OTHER PUBLICATIONS

International Search Report issued Feb. 16, 2010 in corresponding International (PCT) Application No. PCT/JP2009/069307 of record.
Extended European Search Report issued Mar. 1, 2012 in corresponding European Application No. 09824909.7.

* cited by examiner

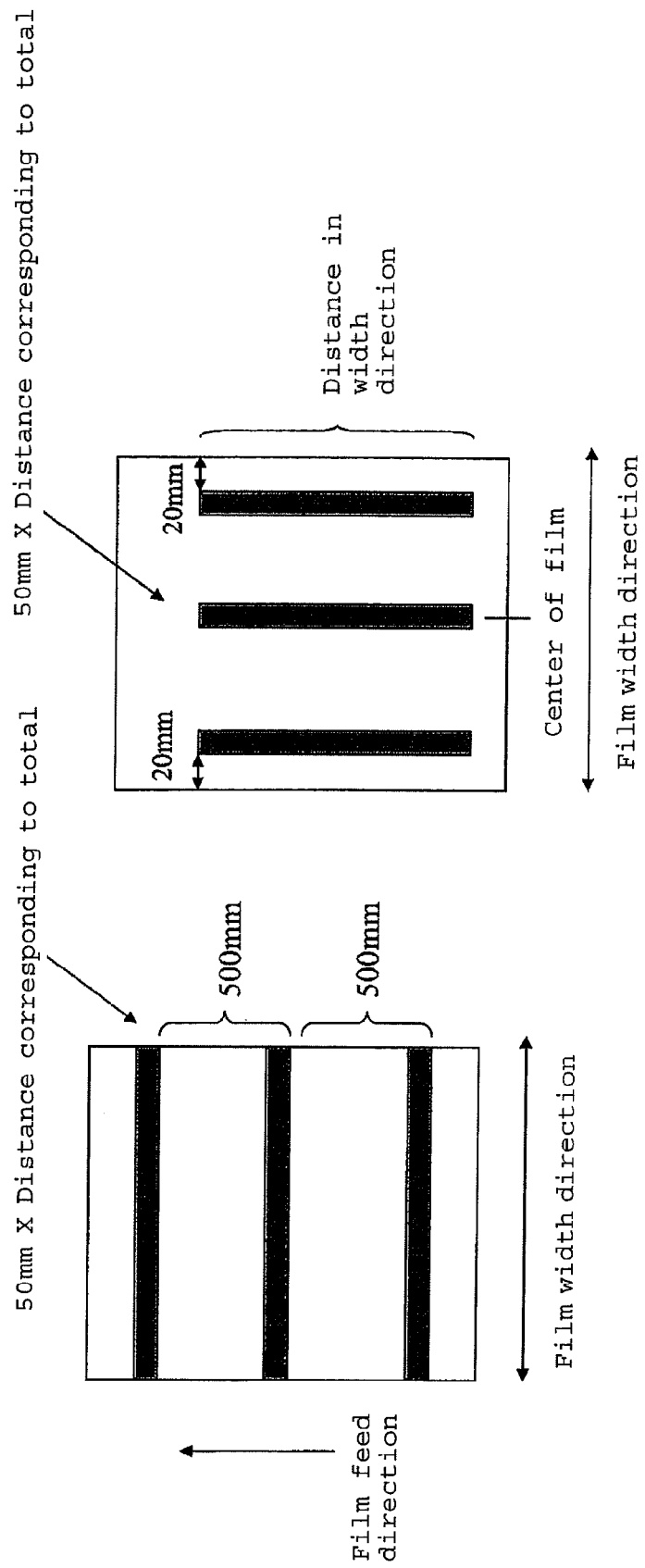

RETARDATION FILM

TECHNICAL FIELD

The present invention relates to a retardation film which is made of a polycarbonate resin and can be used in a liquid crystal display or the like.

BACKGROUND ART

A retardation film which is provided with a specific retardation value by stretching and orienting a polymer film is generally used in a liquid crystal display in order to improve its display quality such as color, contrast and view angle. A retardation film made of a polycarbonate-based polymer resin has been generally used for STN liquid crystal applications. The polycarbonate retardation film is also used as a λ/4 film for 3-D polarizing spectacles which are now in growing demand. The film is produced by a casting method. That is, a polycarbonate is dissolved in a solvent such as methylene chloride, and the resulting solution is extruded from a slit die onto a support medium such as a mirrored steel belt or steel drum as a liquid film which is then dried to obtain an unstretched film. Thereafter, the unstretched film is stretched to orient its molecules so as to produce a retardation film.

A film which is uniform in thickness is easily obtained by the casting method as compared with a melt extrusion method. In the melt extrusion method, a resin is thermally deteriorated by heating or shear stress at the time of kneading, whereby foreign matter defects are readily produced in the film, and the film is readily colored. In respect of these points, the casting method is superior to the melt extrusion method and has been preferably used for optical applications including retardation films.

However, the casting method involves many problems to be solved, such as a huge amount of energy required for the drying and collection of a solvent, high equipment cost as the equipment is relatively large in size, high production cost as the production speed is limited by drying time, and concern about environment due to use of methylene chloride which is a halogen-based solvent. Therefore, the production of a retardation film by the melt extrusion method is now under study energetically, and various studies are being made on a thermoplastic norbornene-based resin as in Patent Documents 1 and 2.

Meanwhile, the following proposals have been made on the polycarbonate-based resin. For example, Patent Document 3 discloses a retardation film having a specific retardation value and a specific dispersion width of the average value of retardation, which is obtained by monoaxially stretching a polycarbonate-based film having a specific intrinsic viscosity and a specific dispersion width of intrinsic viscosity.

Patent Document 4 discloses a retardation compensation film which has a specific value or less of high-molecular weight foreign matter content and is made of a polycarbonate having a viscosity average molecular weight of 20,000 to 100,000.

It is proposed in Examples and Comparative Example 1 of Patent Document 5 to obtain a retardation film by melting a polycarbonate having a molecular weight of 15,000, extruding it from a nozzle to obtain a rod and stretching a disk cut out from the rod.

Patent Document 6 proposes a melt extruded film of a polycarbonate which is useful as a film for the light transmitting layer of an optical disk marketed under the trade name of "Blue-Ray disc" and a protective film for the polarizing plate of a liquid crystal display (WO2007/141899). This film is an optically isotropic unstretched film having a small retardation.

The proposal of a stretched retardation film having few defects produced by foreign matter and small nonuniformity in retardation has been unsatisfactory as described above.

(Patent Document 1) JP No. 3273046
(Patent Document 2) JP No. 3407714
(Patent Document 3) JP No. 2841376
(Patent Document 4) JP No. 3203069
(Patent Document 5) JP No. 2612196
(Patent Document 6) WO2007/141899

DISCLOSURE OF THE INVENTION

It is an object of the present invention which has been made in the above situation to provide a retardation film which is produced from a polycarbonate by a melt extrusion method, has few foreign matter defects and small nonuniformity in retardation and satisfies the required quality of a retardation film.

The inventors of the present invention have conducted intensive studies on film foreign matter defects and nonuniformity in retardation after stretching by stretching various melt extruded polycarbonate films.

As a result, though Patent Document 3 reports a stretched film of a polycarbonate having an intrinsic viscosity of 0.485 to 0.585 dl/g, it was found that it is difficult to obtain a film having few foreign matter defects even after stretching without using a polycarbonate having a specific molecular weight range below the molecular weight of the above polycarbonate in the case of a melt extruded film.

Meanwhile, it was found that when the low-molecular weight film is stretched, a reduction in retardation which seems to be due to orientation relaxation is remarkable as compared with a film having a high molecular weight. Although the reduction in retardation can be canceled by slightly raising the draw ratio, it was also found that when the film is seen as a whole, it is difficult to achieve uniformity in retardation which is one of the very important properties of a retardation film.

To cope with this problem, the inventors of the present invention found that a stretched film having small nonuniformity in retardation is obtained by stretching an unstretched film having thickness nonuniformity in the width direction within a specific range in the longitudinal direction.

Further, the inventors also found that even a film which has been oriented after stretching does not become fragile and is not chipped or cracked even when it is punched into a desired shape after it is laminated with a polarizing film if its molecular weight falls within the range of the present invention though the film tends to become fragile when the molecular weight of a resin is reduced. Therefore, they found that the above film is advantageously used as a λ/4 film for 3-D polarizing spectacles.

As described above, the inventors found that a retardation film having few defects and small nonuniformity in retardation is obtained by stretching a polycarbonate having a specific molecular weight under specific conditions. The present invention was accomplished based on this finding.

That is, according to the present invention, the following inventions are provided.

1. A retardation film obtained by stretching and orienting a melt extruded film of a polycarbonate, wherein
(1) the polycarbonate constituting the film has a viscosity average molecular weight of $1.3 \times 10^4$ to $1.8 \times 10^4$;

(2) the retardation R(589) within the plane of the film measured at a wavelength of 589 nm is 50 to 800 nm;
(3) the retardation R(589) nonuniformity within the plane of the film is ±5 nm;
(4) the average thickness of the film is 10 to 150 µm; and
(5) the number of film defects as large as 100 µm or more is 2 or less/m².

2. The retardation film in the above paragraph 1, wherein the bisphenol A is contained in an amount of not less than 50 mol % of the total of all the bisphenol components of the polycarbonate.

3. The retardation film in the above paragraph 1 or 2 which has a width of 500 to 2,000 mm.

4. The retardation film in any one of the above paragraphs 1 to 3 which is obtained by stretching a melt extruded unstretched film in a longitudinal direction.

5. The retardation film in any one of the above paragraphs 1 to 4 which is obtained by stretching in the longitudinal direction an unstretched film whose thickness nonuniformity (Tc/Te) in the width direction satisfies the following expression:

$$1.02 < Tc/Te < 1.10$$

(Tc is the thickness of the center portion of the film and Te is the thicknesses of the end portions of the film.).

6. A method of producing the retardation film of the above paragraph 1, comprising the steps of:
(i) melt extruding a polycarbonate having a viscosity average molecular weight of $1.3 \times 10^4$ to $1.8 \times 10^4$ to obtain an unstretched film which satisfies the following expression:

$$1.02 < Tc/Te < 1.10$$

(Tc is the thickness of the center portion of the film and Te is the thicknesses of the end portions of the film); and
(ii) stretching the unstretched film in a longitudinal direction.

7. The retardation film in any one of the above paragraphs 1 to 5 which is used as a λ/4 film which is one of the members constituting a circularly polarizing plate for 3-D polarizing spectacles.

BRIEF DESCRIPTION OF THE DRAWINGS

FIG. 1 is a diagram showing the method of measuring a retardation (R) and R nonuniformity.

BEST MODE FOR CARRYING OUT THE INVENTION

The present invention will be described in detail hereinunder.
(Polycarbonate)
The polycarbonate used in the present invention is a polymer in which a dihydroxy compound is bonded by a carbonate bond. Although the production method of the polycarbonate is not particularly limited, in general, a dihydroxy component and a carbonate precursor are reacted with each other by interfacial polymerization or melt polymerization. Typical examples of the dihydroxy component include 2,2-bis(4-hydroxyphenyl)propane (commonly called "bisphenol A"), 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)cyclohexane, 1,1-bis(4-hydroxyphenyl)-3,3,5-trimethylcyclohexane, 1,1-bis(4-hydroxyphenyl)decane, 1,1-bis(4-hydroxyphenyl)octane, 9,9-bis{(4-hydroxy-3-methyl)phenyl}fluorene, 9,9-bis(4-hydroxyphenyl) fluorene, α,α'-bis(4-hydroxyphenyl)-m-diisopropylbenzene, isosorbide, 1,3-propanediol, 1,4-butanediol and 1,6-hexanediol. The dihydroxy component may be a homopolymer of one of them or a copolymer of two or more of them. Out of these, bisphenol A is preferred from the viewpoints of physical properties and cost.

In the present invention, the polycarbonate comprises bisphenol A in an amount of preferably not less than 50 mol %, more preferably not less than 60 mol %, much more preferably not less than 80 mol %, particularly preferably not less than 90 mol % based on the total of all the bisphenol components. Specific examples of the polycarbonate include a homopolymer of bisphenol A, a copolymer of bisphenol A and 1,1-bis(4-hydroxyphenyl)-3,3,5-trimethylcyclohexane and a copolymer of bisphenol A and 9,9-bis{(4-hydroxy-3-methyl)phenyl}fluorene.

In the present invention, the glass transition temperature of the polycarbonate is preferably 100 to 200° C., more preferably 120 to 180° C. When the glass transition temperature is too high, the melt viscosity of the resin becomes too high, thereby making melt film formation difficult disadvantageously. When the glass transition temperature is too low, the heat resistance of the film becomes unsatisfactory, thereby making it unsuitable to use the obtained film as a retardation film.

As the carbonate precursor may be used a carbonyl halide, carbonate ester or haloformate, as exemplified by phosgene, diphenyl carbonate and dihaloformates of a dihydric phenol.

To produce the polycarbonate by reacting the above dihydroxy compound and the carbonate precursor with each other by interfacial polymerization or melt polymerization, a catalyst, a terminal capping agent and an antioxidant for dihydric phenols may be optionally used. The polycarbonate may be a branched polycarbonate resin obtained by copolymerizing a polyfunctional aromatic compound having 3 or more aromatic groups, a polyester carbonate resin obtained by copolymerizing an aromatic or aliphatic difunctional carboxylic acid, or a mixture of two or more obtained polycarbonates.

The molecular weight of the polycarbonate in the present invention is $1.3 \times 10^4$ to $1.8 \times 10^4$ in terms of viscosity average molecular weight. When the molecular weight is lower than $1.3 \times 10^4$, the film becomes fragile and orientation relaxation occurs at the same time as stretching, whereby drawing behavior is apt to become unstable. This becomes obvious as the retardation in the vicinity of the center of the film hardly appears when seen from the width direction of the film with the result that it is difficult to maintain a uniform retardation as a whole film. When the viscosity average molecular weight is higher than $1.8 \times 10^4$, the stretched film is apt to have foreign matter defects disadvantageously though retardation uniformity is obtained after stretching. In the case of a retardation film, foreign matter defects may become visible by stretching though they do not stand out in an unstretched state. When the viscosity average molecular weight is higher than $1.8 \times 10^4$, melt viscosity at the time of melt extrusion may become high. Therefore, foreign matter defects are apt to be produced in the film by yellowing caused by thermal deterioration or gelling.

The viscosity average molecular weight in the present invention is preferably $1.35 \times 10^4$ to $1.75 \times 10^4$, more preferably $1.4 \times 10^4$ to $1.7 \times 10^4$, much more preferably $1.45 \times 10^4$ to $1.6 \times 10^4$. In the case of a mixture of two or more polycarbonates, the viscosity average molecular weight represents the molecular weight of the whole mixture. The viscosity average molecular weight (M) is calculated from the following equations by measuring the specific viscosity ($\eta_{sp}$) of a solution prepared by dissolving 0.7 g of the polycarbonate in 100 ml of methylene chloride at 20° C.

$$\eta_{sp}/c=[\eta]=0.45\times[\eta]^2 c$$

$$[\eta]=1.23\times10^{-4}M^{0.83}$$

(c=0.7 g/dL, [η] represents an intrinsic viscosity.)

In general, it is preferred that an optical film should contain little foreign matter such as gel and impurities. Especially, a film which contains an extremely small number of foreign matter defects is required as a retardation film for use in a liquid crystal display. Although a polycarbonate is used as a material for optical disk substrates, the polycarbonate for optical disks is a resin having an extremely high degree of refining. In the present invention, from the viewpoint of the refining degree of the polymer and the above molecular weight, a polycarbonate of an optical disk grade having a viscosity average molecular weight of around $1.5\times10^4$ can be advantageously used.

(Melt Extrusion)

A description is subsequently given of the method of melt extruding the polycarbonate resin in the present invention.

Prior to melt extrusion, the polycarbonate resin must be fully dried to remove water and inside air completely so as to prevent the foaming of the film and the thermal deterioration of the resin. As a preferred drying method, a raw material chip is dried at about 120° C. for 3 hours or longer before melt extrusion and then injected into the hopper of an extruder, and this hopper is heated from the outside and kept at around 110° C. Thus, it is possible to prevent the foaming of the film by removing water contained in the chip and adhered to the surface. It is also possible to prevent the deterioration of the resin by a chemical reaction such as hydrolysis. To prevent air (oxygen) in the hopper from promoting the thermal deterioration of the resin, it is also preferably recommended to substitute this atmosphere with a thermal nitrogen gas or to cause a thermal nitrogen gas to flow through the hopper.

The resin may become sticky and cling to a screw between the bite start part of the screw and a barrel at a supply port where the resin is first bitten in, whereby the supply of the resin after that is impeded, thereby causing delivery fluctuations. When the resin stays in the extruder for a long time, it may gradually deteriorate and become a brown or black thermally deteriorated product. To prevent this, the barrel portion of the screw bite part (supply part) is preferably cooled with water.

It is important that the thermally deteriorated product should not be produced in a flange for connecting the end portion of the extruder and a filter housing, a molten resin conducting pipe, a pipe for connecting the filter housing and an extrusion die and the filter housing as much as possible, and measures for the prevention of the local residence of the resin include the elimination of a steep curve from a pipe.

Since thermal deterioration is not negligible when the residence time of the polycarbonate resin at a high temperature is long, the residence time from the extruder to the outlet at the end of the die must be made as short as possible. In the case of a polycarbonate which comprises bisphenol A preferably used in the present invention as the main ingredient and has a viscosity average molecular weight of $1.3\times10^4$ to $1.8\times10^4$, it is preferred to set the extrusion molding temperature of the resin to 250 to 320° C. and the residence time to 30 minutes or less. The residence time is more preferably 20 minutes or less, much more preferably 10 minutes or less.

When the residence time is too short, especially when the resin crystallizes, an unmolten product may remain and appear as a foreign matter defect in the film. In this case, the residence time is preferably set to 5 to 10 minutes. This unmolten product passes through a filter element for the resin as gelled foreign matter in most cases. The thermal decomposition of the polycarbonate resin is suppressed by setting the melting temperature and the residence time to the above ranges with the result that thermally deteriorated foreign matter is hardly produced.

The temperatures of the cylinder and die of the extruder are preferably set to ensure that the melt viscosity of the polycarbonate resin at a shear rate of 100 (1/s) at these temperatures becomes 50 to 600 Pa·s, preferably 70 to 300 Pa·s. By setting the temperatures of the cylinder and die of the extruder to this range, the melt extruded polycarbonate exhibits suitable fluidity, and shear stress in the extruder, the inside of the die and the die lip is suppressed, thereby making it possible to reduce the birefringence ratio, especially the in-plane birefringence ratio. When a film is formed at the above viscosity range, a drift and residence in the cylinder, the filter and the filter housing hardly occur, thereby suppressing the production of thermally deteriorated foreign matter such as gel.

The delivery capacity of the extruder is set in consideration of the above preferred residence time. From the industrial point of view, to produce a film having a width of about 1,000 mm and a thickness of about 50 μm, an extruder having a maximum delivery rate of 130 kg/h is preferably selected. Ordinary screws for melt extruding a polycarbonate may be used, out of which a uniaxial screw is preferred.

In the production of a film by melt extrusion in the present invention, the resin is preferably let pass through a filter after extrusion. A filter comprising a leaf disk-like filter element with a required filtration area and a cylindrical housing for holding this is preferred as the filter. A filter element having an average opening diameter of 2 to 20 μm and composed of a metal nonwoven fabric is preferably used as the filter element, and a filter element having an average opening diameter of 2 to 10 μm is more preferred. When the opening diameter of the filter element in use is too large, the collection capability of foreign matter lowers, whereby foreign matter defects stand out in the film and when the opening diameter is too small, the differential pressure becomes high, thereby making it impossible to raise the flow rate of the polymer and the filtration speed. As a result, the residence of the polymer in the filter readily occurs and accordingly, the amount of foreign matter may increase disadvantageously. A material which does not promote the thermal deterioration of the resin even when the resin stays in the filter is preferred as the material of the filter element, as exemplified by stainless steel. By using this fine filter, a polycarbonate film having few foreign matter defects can be obtained not only before stretching but also after stretching.

As the melt extrusion die used in the present invention may be used a conventionally known die such as a T-die (coat hanger type die) for supplying the resin from the center portion in the width direction of the die or an I-die having a structure that the resin flow-in part of the T-die is divided into two and the resin is let flow in from one end in the width direction of the die. A lip from which the resin is delivered in the extrusion die is preferably finished to have a fully sharp form.

The opening of the die (lip opening) in the present invention is preferably set to 5 t to 25 t, more preferably 7 t to 20 t when the desired thickness of the film is represented by "t". More specifically, in the case of a film having a thickness of 100 μm, the lip opening is set to preferably 0.5 to 2.5 mm, more preferably 0.7 to 2 mm. By setting the die lip to the above range, shear stress which is received by the resin to be delivered at the die lip is reduced and the birefringence ratio, especially the in-plane birefringence ratio can be made small. Since the lip opening is fully wide with respect to the thickness of the film, a scratch on the die lip or a die streak produced by contact with a deposit is suppressed advantageously. For retardation film applications as in the present invention, the die streak of the film is desirably suppressed as much as possible.

The thickness nonuniformity in the width direction of the film is controlled by adjusting the lip space by rotating the lip bolt of the die mechanically or by installing heaters on the die lip at fixed intervals and adjusting the temperatures of the heaters independently so as to control the thickness of the film, making use of the temperature variations of the viscosity of the molten resin (temperature lip).

To cool the molten resin film extruded from the die, only one roll may be used to cool the film, or a plurality of rolls may be used to cool the film. The temperature of the chill roll is preferably Tg−40° C. to Tg, more preferably Tg−30° C. to Tg−1° C. when the glass transition temperature of the polycarbonate resin in use is represented by Tg (° C.). When the temperature of the chill roll is set below the above range, the adhesion of the resin film to the roll lowers with the result that air inclusion readily occurs and the homogeneity of the film tends to deteriorate. When the temperature of the chill roll is higher than the glass transition temperature, the adhesion of the film to the roll becomes too high with the result that when the film is removed from the roll, the film is readily scratched or distorted disadvantageously.

The surface temperature of the chill roll can be preferably controlled uniformly. To keep the surface temperature of the chill roll uniform, a cooling medium whose temperature is controlled is preferably let flow in the chill roll. Preferably, the chill roll has a mirror surface and is made of a material such as hard chrome or ceramic.

At this point, the air gap, that is, the gap between the end of the die and the drop point of the molten resin on the chill roll is preferably 5 to 50 mm. The air gap is more preferably 5 to 30 mm, much more preferably 5 to 25 mm.

When the air gap is too wide, the molten resin may be swayed by the influence of turbulence of surrounding air, which may lead to very small thickness nonuniformity in the film feed direction and eventually to nonuniformity in retardation after stretching. This trend is strong particularly in the case of the polycarbonate resin having a viscosity average molecular weight of $1.3 \times 10^4$ to $1.8 \times 10^4$ used in the present invention because its melt viscosity is low. Therefore, the air gap is preferably made as small as possible.

In the present invention, the film forming rate is not particularly limited and may be suitably set to a range that satisfies the required physical properties of the film. Although the film forming rate is desirably higher from the viewpoint of productivity, when the film forming rate is too high, the adhesion of the film to the roll degrades due to air inclusion in a cast portion, thereby impairing the homogeneity of the film. In the present invention, the film forming rate is preferably 2 to 50 m/min, more preferably 5 to 30 m/min.

In the present invention, the film can be preferably adhered tightly to the chill roll electrostatically. Although orientation in the width direction of the film becomes strong when the film is adhered tightly to the roll electrostatically, if the retardation nonuniformity of the film and the optical axis after stretching fall within target ranges, the adhesion of the film to the roll increases, thereby enhancing the thickness uniformity and retardation uniformity of the film, especially the uniformity in the width direction of the film advantageously.

As for electrostatic adhesion, wire pinning for adhering the entire surface of the film or edge pinning for adhering only both end portions of the film is employed, and both may be used. A conventionally known SUS metal wire is used as the wire for electrostatic adhesion and stretched on the film plane, preferably a space as wide as 4 to 7 mm with suitable tension. When only both end portions are electrostatically adhered, a metal wire situated on the film plane excluding the both end portions and covered with an insulating substance (such as a resin thin tube) is used, or a needle-like pin for applying voltage to the end portions is installed. The position for installing the metal wire or the voltage to be applied may be suitably determined while the film forming state is observed. However, the voltage is preferably about several kV to 10 kV.

(Thickness Nonuniformity in Width Direction of Unstretched Film)

The thickness nonuniformity (Tc/Te) in the width direction of the unstretched film preferably satisfies the following expression.

$$1.02 < Tc/Te < 1.10$$

(Tc is the thickness of the center portion of the film, and Te is the thicknesses of the end portions of the film.)

More preferably, $1.03 < Tc/Te < 1.07$.

The thicknesses Te of the end portions of the film are the thicknesses of the both end portions of the film at a distance of 20 mm from the ends of the film and means that both the thicknesses of the two both end portions fall within the above range. The thickness nonuniformity is preferably symmetrical along the width direction with the center of the film as a standard. When the above value is not more than 1.02, it is difficult to reduce the retardation nonuniformity in the width direction of the film to a range of ±5 nm and when the above value is not less than 1.10, the retardation of the center portion of the film becomes high, thereby making it difficult to reduce the retardation nonuniformity to a range of ±5 nm, and a problem such as wrinkling by stretching readily occurs due to large thickness nonuniformity. The optimal thickness distribution may be suitably selected according to the type of the polycarbonate in use and stretching conditions.

The unstretched film which satisfies the above expression can be produced by adjusting the width direction of the die as described above. More specifically, when the lip space is adjusted by rotating the lip bolt mechanically, the above unstretched film can be produced by making the lip space in the vicinity of the center of the die wide and the lip space at both ends narrow by adjusting the bolt. When the thickness is adjusted by temperature control (temperature lip), the above unstretched film can be produced by making the temperature in the vicinity of the center of the die high and the temperature at both ends low. The control of the thickness in the width direction of the film may be carried out by measuring the thickness with an on-line thickness meter in the film forming process or by sampling the film from time to time, on-line measuring the thickness of the film and feeding back the measurement result.

(Winding-Up)

The retardation film of the present invention is obtained by stretching the unstretched film obtained as described above. In the present invention, the unstretched film may be wound up and then stretched separately, or film formation and stretching may be carried out continuously. From the industrial point of view, a production method in which film formation and stretching are carried out continuously is preferred in terms of productivity.

When the unstretched film is wound up to make a film roll, to protect the surface of the film and prevent telescoping, preferably, the unstretched film is wholly lap wound with another polymer film, for example, a biaxially oriented polyester film, or a polyolefin protective film having a weak adhesion layer on the surface is used.

The film width of a roll of the unstretched film is preferably wider from the viewpoint of productivity but preferably 600 to 2,500 mm, more preferably 800 to 2,000 mm due to the restrictions of equipment. When edge trimming is carried out, the above preferred film width is a value after edge trimming. The winding length (the length of the film) may be determined from the viewpoints of handling ease and productivity and not particularly limited but preferably 50 to 4,000 m.

(Stretching)

As the stretching method for producing the retardation film of the present invention, known methods such as longitudinal monoaxial stretching in which the film is stretched between rolls, transverse monoaxial stretching in which the film is stretched by using a tenter, simultaneous biaxial stretching which is a combination of these, or sequential biaxial stretching may be employed. The optimal stretching method may be selected according to purpose. For STN liquid crystal applications in which the retardation film of the present invention is advantageously used, longitudinal monoaxial stretching is preferably employed.

In the longitudinal monoaxial stretching, stretching is carried out between a pair of rolls which differ from each other in rolling speed. However, two-stage stretching in which another set or another pair of rolls which differ from each other in rolling speed are installed may be employed, and the optimal stretching method may be selected according to the draw ratio, film width and stretching speed. To minimize stretching nonuniformity in longitudinal stretching between rolls, the inside temperature in the width direction of the film in a stretching chamber is preferably set to around ±0.5° C. Therefore, the film is preferably heated with an air jet between rolls, and the flow rate of the air jet which is hot air is preferably set to 5 to 25 m/sec. When the distance between rolls which is equivalent to the stretch span is 1.5 times or more larger than the width of the film before stretching, so-called "width-free longitudinal monoaxial stretching" in which the width and thickness of the film freely change occurs, and the film becomes a so-called "A-plate retardation film" in which the 3-D birefringence satisfies nx>nx=nz. This film is preferably used for STN liquid crystal applications.

In the stretching of the present invention, the stretching temperature is preferably Tg−5° C. to Tg+30° C., more preferably Tg° C. to Tg+20° C. when the glass transition temperature of the polycarbonate film is represented by Tg (° C.). Although the draw ratio is suitably selected to achieve the target retardation value and not particularly limited, it is about 1.05 to 2 times. Although the stretching speed is preferably fast from the viewpoint of productivity, as the speed becomes faster, the retardation value becomes larger. Therefore, it is determined according to balance between stretching temperature and draw ratio, and the delivery rate is about 2 to 30 m/min.

If the temperature of the film is drastically reduced from the stretching temperature to room temperature even when the film after the end of stretching comes out from the stretching zone to be cooled in space or to be cooled by contact with a roll, wrinkles are readily formed in parallel to the longitudinal direction, that is, the feed direction of the film by the heat shrinkage of the film. When the wrinkles formed by this expansion and shrinkage are cooled rapidly, they may be fixed and remain as so-called wavy wrinkles which are almost parallel to the longitudinal direction. The wavy wrinkles can be suppressed by bringing the stretched film into contact with a roll at 80 to 150° C. or heating it with air between rolls and cooling it to room temperature.

<Retardation Film>

(Average Thickness)

The retardation film of the present invention has an average thickness of 10 to 150 μm. When the average thickness is smaller than 10 μm, it is difficult to handle the film and when the average thickness is larger than 150 μm, it is not suitable for use as a retardation film which is desired to be thin and the draw ratio becomes low at the time of stretching, thereby making it difficult to match uniformity in retardation and the optical axis. The average thickness is preferably 20 to 100 μm, more preferably 30 to 80 μm. The average thickness is the average of measurement values obtained by measuring the thickness of the film in the entire width direction continuously or at fixed intervals.

(In-Plane Retardation R(589))

The retardation film of the present invention has an in-plane retardation R(589) measured at a wavelength of 589 nm of 50 to 800 nm. The retardation R is defined by the following equation (1) and represents the phase lag of light passing in a direction perpendicular to the film.

$$R=(n_x-n_y)\times d \quad (1)$$

In the above equation, $n_x$ is the refractive index of the slow axis (axis having the highest refractive index) within the plane of the film, $n_y$ is a refractive index in a direction perpendicular to $n_x$ within the plane of the film, and d is the thickness of the film.

Since so-called λ/4, λ/2 and λ plates obtained by longitudinal monoaxial stretching are often used as a polycarbonate retardation film, retardation films having R values of around 140 nm, 280 nm and 570 nm are preferably used. In the case of a retardation film obtained by longitudinal monoaxial stretching, a film similar to the so-called "A-plate film" having 3-D birefringence which satisfies $n_x>n_y=n_z$ in the thickness direction as well is preferred from the viewpoint of view angle. In other words, the coefficient $N_z$ defined by the following equation (2) is preferably as close to "1" as possible.

$$N_z=(n_x-n_z)/(n_x-n_y) \quad (2)$$

(in the above equation (2), $n_x$, $n_y$ and $n_z$ are 3-D refractive indices of the film, $n_x$ is the refractive index of the in-plane slow axis (x axis), $n_y$ is a refractive index in a direction (y axis) orthogonal to the x axis in the in-plane direction, and $n_z$ is a refractive index in the thickness direction (z axis) perpendicular to the plane including the x axis and the y axis.)

In the formation of an unstretched film by the casting method, $n_z$ is apt to be reduced by plane orientation in the drying step and therefore, $N_z$ is apt to become larger than "1" after longitudinal monoaxial stretching. In the case of melt extrusion, as the 3-D optical isotropy including $n_z$ of the unstretched film is high, a longitudinally stretched film having $N_z$ close to "1" is easily obtained. A polycarbonate retardation film obtained by the melt extrusion method is superior in this feature to a retardation film obtained by the casting method. In the present invention, $N_z$ after longitudinal monoaxial stretching satisfies preferably $0.98 \leq N_z < 1.02$, more preferably $0.99 \leq N_z \leq 1.01$.

(In-Plane Retardation R(589) Nonuniformity)

The retardation film of the present invention has a retardation R(589) nonuniformity within the plane of the film measured at a wavelength of 589 nm of ±5 nm. The figure "±5 nm" indicates a dispersion range from the average value of the film. More specifically, the retardation of the film is measured at several points in longitudinal and transverse directions continuously to obtain the average value of retardation of the whole film, and the deviations of the maximum value and the minimum value out of all the measurement values from the average value are obtained to calculate the in-plane retardation R(589) nonuniformity.

λ/4, λ/2 and λ plates obtained by longitudinal monoaxial stretching are often used as the polycarbonate retardation film as described above. In the present invention, in the case of λ/4 and λ/2 plates having R's of around 140 nm and 270 nm, the retardation nonuniformity is preferably ±3 nm, more preferably ±2 nm. In the case of a λ plate having an R of around 570 nm, the retardation nonuniformity is preferably ±4 nm, more preferably ±3 nm.

In general, what has greatest influence upon the retardation nonuniformity of the stretched film is the thickness nonuniformity of the unstretched film. The film has thickness nonuniformity in the width direction (transverse direction) of the film and thickness nonuniformity in the feed direction (longitudinal direction) of the film. In the present invention, as for the thickness nonuniformity of the unstretched film, the thickness in the feed direction of the film is preferably as uniform as possible whereas, in the width direction, the center portion of the film is preferably made a little thicker than the end portions of the film. This thickness change is preferably made as smooth as possible.

In the longitudinal monoaxial stretching of the low-molecular weight polycarbonate film of the present invention, the retardation nonuniformity in the feed direction of the film tends to become small even after stretching but the retardation of the center of the film strongly tends to become smaller than the retardation of the end portions in the width direction of the film by stretching. This is considered to be due to the fact that a tendency toward the occurrence of orientation relaxation during stretching is strong because of the low molecular weight and the orientation relaxation is readily developed in the center of the film. In the longitudinal stretching of an unstretched film having flat thickness nonuniformity in the width direction, it is apt to be difficult to maintain a uniform retardation as the retardation in the vicinity of the center of the film is smaller than that of the end portions.

It is preferred that the optical axis, that is, the slow axis within the plane of the retardation film of the present invention should be aligned as much as possible. More specifically, in the case of a longitudinally stretched retardation film according to a preferred embodiment of the present invention, the shift of the optical axis of the film is preferably in the range of ±1°, more preferably ±0.7° in the stretching direction, that is, the feed direction of the film. The optical axis can be controlled by adjusting uniformity in the inside temperature of a stretching machine, the draw ratio and the stretching temperature in the stretching stage.

(Defects)

In the present invention, the number of defects as large as 100 μm or more of the retardation film is 2 or less/m², more preferably 1 or less/m², much more preferably 0.5 or less/m². The expression "100 μm or more" means that a defect has a long side of 100 μm or more. The above large defects of the film can be measured by using an on-line automatic defect detector in the process, and the stretched film can be evaluated by passing it through the detector. The defects can also be evaluated visually. In this case, light is applied to the film from an oblique direction, its reflected light is observed to detect defects, and each of the picked up defects is observed through a polarizing microscope to judge its size. The defects may become visible in the step of forming an unstretched film or may become visible by stretching though the defects do not stand out in the unstretched film. As for the types of defects, there are yellowing, foreign matter such as gel, scratches and cuts. Scratches and cuts can be prevented by paying attention to the abrasion of the film at the time of film formation and stretching and dust on a nip roll. Yellowing and foreign matter defects such as gel can be greatly reduced by using the polycarbonate and the film forming method of the present invention to form a film as described above.

(Film Width)

The retardation film of the present invention is preferably a rolled film having a width of 500 to 2,000 mm, more preferably 500 to 1,500 mm from a practical point of view. It is possible to increase the width by using a die having a large width but the restrictions of equipment become large. The rolled film after stretching may be slit with a slitter to adjust its width to a target value. The length of the film roll may be determined according to use and equipment and not particularly limited but generally about 10 to 4,000 m.

To roll the film, (i) a so-called "knurling winding-up" method in which the both end portions of a wide film are knurled to a narrow width mechanically or thermally to space apart the inner surfaces of the film from each other so as to prevent abrasion between them, (ii) a co-winding (or lap winding) method in which only both end portions of the film are lap wound with a narrow film of another material to protect the inner surface of the film from abrasion, (iii) a method in which the film of the present invention is wholly lap wound with another polymer film, and (iv) a method in which the film of the present invention is lap wound with a protective film having a weak adhesion layer on the surface before use may be employed. A preferred method may be selected from among the above methods of protecting the surface of the film according to use conditions. However, the method using a protective film is preferred from the viewpoints of handling ease, productivity and influence upon the physical properties of the film.

In general, a protective film comprising a relatively soft film having a low Young's modulus, such as polyethylene or polypropylene, as a substrate and processed to have a weak adhesion surface is often used as the protective film. The protective film is lap wound with the film of the present invention in the production process. More specifically, the protective film is first set in an unwind machine to be unwound. At this point, very weak force must be used to unwind the protective film so that the protective film is not deformed by pulling with unwinding tension. Preferably, the protective film unwound as described above is merged with the film of the present invention and weakly nipped with nip rolls to be laminated with the film of the present invention so that the adhesion surface of the protective film comes into contact with the surface of the film of the present invention, and the resulting laminate is wound up. The protective film laminated composite is also preferably wound up with weak winding-up tension.

(Others)

The retardation film of the present invention may contain various additives such as a heat stabilizer, antioxidant, ultraviolet absorbent, toning agent and antistatic agent as long as the physical properties, for example, transparency of the film are not impaired.

The retardation film of the present invention is suitable for use as a retardation film which is laminated with a polarizing plate for the improvement of view angle characteristics of a liquid crystal display, especially a retardation film for STN liquid crystal applications. It may also be advantageously used as a λ/4 plate for use in 3-D polarizing spectacles for viewing 3-D images. Other applications of the retardation film of the present invention are not limited, and the retardation film of the present invention can be used for other applications which require the characteristic properties of the film.

The film may be coated with a hard coat agent and other agents to improve its gas barrier properties and solvent resistance, and a film whose optical properties have been changed by coating a liquid crystal compound thereon may also be used.

EXAMPLES

The following examples are provided for the purpose of further illustrating the present invention but are in no way to be taken as limiting. The physical properties were measured by the following methods in Examples and Comparative Examples.

(1) Viscosity Average Molecular Weight of Polycarbonate

The viscosity average molecular weight (M) of the polycarbonate was calculated based on the following equation from an intrinsic viscosity [η] obtained by measuring the viscosity of a methylene chloride solution having a concentration of 0.7 g/dL at 20° C.

$$\eta_{sp}/c = [\eta] + 0.45 \times [\eta]^2 c \text{ ([\eta] represents an intrinsic viscosity)}$$

$$[\eta] = 1.23 \times 10^{-4} M^{0.83}$$

$$c = 0.7$$

(2) Glass Transition Temperature (Tg)

This was measured at a temperature elevation rate of 20° C./min with the 2920 DSC of TA Instruments Co., Ltd. to obtain a flexion point.

(3) In-Plane Retardation R, Retardation R Nonuniformity, $N_z$ and Slow Axis

They were measured with the KOBRA-WFD retardation meter of Oji Scientific Instruments. The retardation R was measured at a wavelength of 589 nm, and a range immeasurable at a wavelength of 589 nm was obtained by measuring a retardation at a wavelength of 750 nm and converting the measurement value into a retardation value at a wavelength of 589 nm according to the wavelength dispersion characteristics of the polycarbonate. $N_z$ was measured by using a 3-D refractive index measurement mode. The slow axis of the film was measured continuously at measurement intervals of 10 mm in the width direction of the film, and the shift of the slow axis was measured with the feed direction (longitudinal direction) of the film as 0°.

The retardation (R) nonuniformity was obtained as follows. The retardations (R) of three reed-shaped film samples having a width of 50 mm obtained by cutting the film at intervals of 500 mm in parallel to the width direction of the film (therefore, the distance was equal to the width of the film) were measured continuously at a pitch of 10 mm.

The retardations (R) of three reed-shaped film samples having a width of 50 mm and a length equal to the width of the film obtained by cutting out from the center portion of the film and from both end portions at a distance of 20 mm from the ends of the film in parallel to the feed direction of the film were measured continuously at a pitch of 10 mm.

The average value of the retardation data of the six film samples was obtained to calculate the size of nonuniformity from the deviations (±) of the maximum value and the minimum value of all the measurement data of the six film samples from the average retardation value. The measurement methods of the retardation (R) and the R nonuniformity are shown in FIG. 1.

(4) Film Thickness

This was measured with the electronic micro-film thickness meter of Anritsu Corporation. The thickness of the center portion of the film and the average thickness of the film after stretching are shown in Examples and Comparative Examples. The average thickness was obtained by measuring the thickness of the film along the entire width at a pitch of 10 mm in parallel to the width direction of the film, and the average value of the measurement data was taken as average thickness.

(5) Film Defects

The defects of the film were evaluated with the on-line film automatic defect detector of Hyutec Co., Ltd. and visually. In the case of visual evaluation, after the protective film was removed, light was applied to the film from an oblique direction to observe reflected light and detect defects, the number of picked-up defects was observed through a polarization microscope to judge the size of each defect, and the number of defects having a long side of 100 μm or more was counted.

Example 1

Melt Extrusion

A pellet of a polycarbonate resin of optical grade which is a homopolymer of bisphenol A and manufactured by Teijin Chemicals Ltd. (trade name: AD-5503, Tg; 145° C., viscosity average molecular weight; 15,200) was dried at 120° C. for 4 hours with the dehumidification hot air drier of Matsui Seisakusho Co., Ltd. A single-screw extruder was used. The dried resin pellet was injected into the heating hopper of a melt extruder heated at 110° C. The cylinder temperature of the extruder was set to 270° C., and a SUS nonwoven fabric leaf disk-like filter having an average opening of 10 μm was installed between the extruder and a T-die. The molten resin right after delivery was extruded from the T-die set to 260° C. onto the surface of a rotating chill roll. The lip width of the extrusion die was 1,800 mm, and the lip opening was 1 mm. A die lip having a flat under surface without any irregularities was used. Three chill rolls were used and had a diameter of 360 mm, a length of 1,900 mm and a structure that a cooling medium was circulated therethrough to obtain a uniform surface temperature.

The air gap between the end of the die lip and the surface of the chill roll was set to 15 mm, the temperature of the first chill roll was set to 130° C., the temperature of the second chill roll was set to 125° C., the temperature of the third chill roll was set to 120° C., when the rolling speed of the first chill roll was represented by $R_1$, the rolling speed of the second chill roll was represented by $R_2$, and the rolling speed of the third chill roll was represented by $R_3$, $R_1$ was set to 8 m/min, the ratio $R_2/R_1$ was set to 1.005 and the ratio $R_3/R_2$ was set to 1.000. The film was circumscribed to the first chill roll, the second chill roll and the third chill roll sequentially, and wound up by a take-off roll. As for the thickness in the width direction of the film, after the film was shaped like a mountain so that the center portion of the film became thicker than the other portions, the both end portions of the film were cut 100 mm to obtain a film sample having a width of 1,500 mm and a thickness of about 74 μm, and 1,000 m of the resulting film was co-wound with a polyethylene protective film having a thickness of 30 μm to obtain an unstretched film roll. As for the thickness nonuniformity in the width direction of the obtained unstretched film, the thickness of the center portion (Tc) of the film was 74 μm, the thicknesses of both end portions (Te) of the film at a distance of 20 mm from the ends of the film were 71 μm, and Tc/Te was 1.04.

(Stretching)

Then, this film roll was set in the unwinding unit of a longitudinally stretching machine for stretching between nip rolls in a dry furnace having a zone length of 7 m, let pass through the longitudinally stretching machine while the protective film was removed and stretched to 1.07 times in the longitudinal direction at a delivery rate of 6 m/min and a temperature of 150° C., a polyethylene protective film having a thickness of 30 μm was laminated with the film, the edges of the resulting laminate were cut off, and the remaining film was wound up to obtain a rolled stretched film. The physical properties of the obtained stretched film are shown in Table 1. It was a λ/4 plate having a retardation of 140 nm, and the retardation nonuniformity and the shift of the slow axis of the film were small. Film defects as large as 100 μm or more were rarely seen with an automatic detector and visually, and a die streak was very small. Therefore, the film was very uniform in appearance and suitable for use as a retardation film.

Examples 2 to 4

The unstretched film roll obtained in Example 1 was stretched in the longitudinal direction by changing the stretching conditions, and the film was wound up. The physical properties of the obtained stretched film are shown in Table 1. Like Example 1, the film had small retardation nonuniformity and few defects and was suitable for use as a retardation film.

Example 5

An unstretched film having a thickness of 43 μm and a width of 1,500 mm was formed in the same manner as in Example 1 except that $R_1$ was set to 13.8 m/min and co-wound with a protective film to obtain a 1,000 m-long film roll. As for the thickness nonuniformity in the width direction of the obtained unstretched film, the thickness of the center portion (Tc) of the film was 43 μm, the thicknesses of the end portions (Te) at a distance of 20 mm from the ends of the film were 41 μm, and Tc/Te was 1.05.

Then, the film was stretched in the longitudinal direction with the same longitudinally stretching machine as in Example 1 and then laminated with a polyethylene protective film having a thickness of 30 μm, the edges of the resulting laminate were cut off, and the remaining film was wound up to obtain a rolled stretched film. The physical properties of the obtained stretched film are shown in Table 1. Like Example 1, the stretched film had small retardation nonuniformity and few defects and was suitable for use as a retardation film.

Examples 6 and 7

The unstretched film roll obtained in Example 5 was stretched in the longitudinal direction by changing stretching conditions, and the film was wound up. The physical properties of the obtained stretched film are shown in Table 1. Like Example 5, the film had small retardation nonuniformity and few defects and was suitable for use as a retardation film.

Example 8

A polycarbonate resin pellet comprising bisphenol A having a viscosity average molecular weight of 17,000 (Tg=148° C.) was used. The pellet was melt extruded in the same manner as in Example 1 except that the temperature of the first chill roll was set to 133° C., the temperature of the second chill roll was set to 128° C. and the temperature of the third chill roll was set to 123° C., and the both end portions of the film were cut off 100 mm to obtain a film having a width of 1,500 mm and a thickness of about 74 μm, and 1,000 m of the obtained film was co-wound with a polyethylene protective film having a thickness of 30 μm to obtain an unstretched film roll. As for the thickness nonuniformity in the width direction of the obtained unstretched film, the thickness of the center portion (Tc) of the film was 74 μm, the thicknesses of the both end portions (Te) at a distance of 20 mm from the ends of the film were 71 μm, and Tc/Te was 1.04.

Then, the unstretched film was stretched in the longitudinal direction with the same longitudinally stretching machine as in Example 1 and then laminated with a polyethylene protective film having a thickness of 30 μm, the edges of the resulting laminate were cut off, and the remaining film was wound up to obtain a rolled stretched film. The stretching conditions and the physical properties of the obtained stretched film are shown in Table 1. Like Example 1, the stretched film had small retardation nonuniformity and few defects and was suitable for use as a retardation film.

Example 9

A polycarbonate resin (trade name: AD-5503) manufactured by Teijin Chemicals Ltd. was used and melt extruded and stretched simultaneously and continuously. The film was melt extruded in the same manner as in Example 1 except that the rolling speed $R_1$ of the first chill roll was set to 6 m/min and the delivery rate was adjusted to attain a predetermined thickness so as to obtain an unstretched film having a thickness of about 74 μm which was then wound up temporarily. After the edges of the obtained film were cut off to a width of 1,550 mm, the thickness nonuniformity in the width direction was adjusted to ensure that the thickness of the center portion (Tc) of the film in the width direction was 74 μm, the thicknesses of the end portions (Te) of the film at a distance of 20 mm from the ends of the film were 71 μm, and Tc/Te was 1.04. Then, the film was stretched to 1.07 times in the longitudinal direction at 150° C. as in Example 1 by letting the film pass through the longitudinally stretching machine at a rate of 6 m/min. Further, the thickness nonuniformity of the unstretched film was finely adjusted while it was stretched continuously to finely control the retardation nonuniformity in the width direction of the stretched film, the film was laminated with a polyethylene protective film having a thickness of 30 μm, the edges of the resulting laminate were cut off, and the remaining film was wound up to obtain a rolled stretched film. The physical properties of the obtained stretched film are shown in Table 1. A rolled retardation film having a width of 1,330 mm was obtained.

Example 10

Melt extrusion and stretching were carried out continuously in the same manner as in Example 9 except that the draw ratio was changed from 1.07 times to 1.06 times, the obtained film was laminated with a protective film, the edges of the obtained laminate were cut off, and the remaining film was wound up to obtain a rolled stretched film. The physical properties of the obtained stretched film are shown in Table 1. A rolled retardation film having a width of 1,330 mm was obtained.

Comparative Example 1

A polycarbonate resin pellet comprising bisphenol A having a viscosity average molecular weight of 12,000 (Tg=141° C.) was used and melt extruded in the same manner as in Example 1, and the both end portions of the obtained film were cut off 100 mm to obtain a film having a width of 1,500 mm and a thickness of about 74 μm. 1,000 m of the obtained film was co-wound with a polyethylene protective film having a thickness of 30 μm to obtain an unstretched film roll. As for the thickness nonuniformity in the width direction of the obtained unstretched film, the thickness of the center portion (Tc) of the film was 74 μm, the thicknesses of the both end portions (Te) at a distance of 20 mm from the ends of the film were 69 μm, and Tc/Te was 1.07.

When the film was stretched in the longitudinal direction by using the same longitudinally stretching machine as in Example 1, stretching was unstable, and the film was broken and wrinkled very often and therefore could not be stretched stably. The stretching conditions and the physical properties of the partly wound film are shown in Table 1. Although the number of defects of the film was as small as that of Example 1, as stretching was unstable, a film having a large retardation nonuniformity in the feed direction of the film of ±7 nm was obtained.

Comparative Example 2

A polycarbonate resin pellet comprising bisphenol A having a viscosity average molecular weight of 22,200 (Tg=150° C.) was used and melt extruded in the same manner as in Example 1 except that the cylinder temperature of the extruder was changed to 280° C., the temperature of the molten resin right after delivery was changed to 270° C., the temperature of the first chill roll was changed to 135° C., the temperature of the second chill roll was changed to 130° C. and the temperature of the third chill roll was changed to 125° C. The both end portions of the film were cut off 100 mm to obtain a film having a width of 1,500 mm and a thickness of about 74 μm, and 1,000 m of the film was then co-wound with a polyethylene protective film having a thickness of 30 μm so as to obtain an unstretched film roll. As for the thickness nonuniformity in the width direction of the obtained unstretched film, the thickness of the center portion (Tc) of the film was 74 μm, the thicknesses of the both end portions (Te) at a distance of 20 mm from the ends of the film were 73 μm, and Tc/Te was 1.01. The foreign matter defects of the film stood out when the film was unstretched.

The film was stretched in the longitudinal direction by using the same longitudinally stretching machine as in Example 1 and laminated with a polyethylene protective film having a thickness of 30 μm, the edges of the resulting laminate were cut off, and the remaining film was wound up to obtain a stretched film. The stretching conditions and the physical properties of the obtained stretched film are shown in Table 1. Although it was a film having small retardation nonuniformity like Example 1, it had a large number of defects and could not be used as a retardation film.

Comparative Example 3

An unstretched film was wound up after the thickness nonuniformity in the width direction of the film became almost flat at a thickness of 74 μm, that is, Tc/Te became 1.00 in the formation of an unstretched film in Example 1. The film was stretched in the longitudinal direction under the same conditions as in Example 1, the edges of the film were cut off, and the remaining film was wound up. When seen from the width direction of the film, the retardation R(589) in the vicinity of the center of the film was 140 nm and the retardations R(589) of the end portions of the film were 156 nm with the result that the retardation nonuniformity was very large (±8 nm).

Example 11

A circularly polarized plate was fabricated by using the retardation film obtained in Example 9. A commercially available polarizing film and the retardation film of the present invention were laminated together by means of an acrylic pressure-sensitive adhesive (PSA) in such a manner that the angle between the absorption axis of the polarizing film and the slow axis of the retardation film was 45°. A test was made to punch this film out into various shapes corresponding to the frame shapes of spectacles, and no film chipping and breakage were observed. Therefore, it was found that there was no problem with use of the film in 3-D polarizing spectacles.

TABLE 1

| | Longitudinally stretching conditions | | |
|---|---|---|---|
| | Stretching temperature ° C. | Draw ratio times | Delivery rate m/min |
| Example 1 | 150 | 1.07 | 6 |
| Example 2 | 152 | 1.10 | 7 |
| Example 3 | 150 | 1.19 | 6 |
| Example 4 | 150 | 1.41 | 6 |
| Example 5 | 150 | 1.15 | 6 |
| Example 6 | 150 | 1.30 | 6 |
| Example 7 | 150 | 1.53 | 6 |
| Example 8 | 153 | 1.06 | 6 |
| Example 9 | 150 | 1.07 | 6 |
| Example 10 | 150 | 1.06 | 6 |
| Comparative Example 1 | 146 | 1.10 | 6 |
| Comparative Example 2 | 156 | 1.06 | 6 |
| Comparative Example 3 | 150 | 1.07 | 6 |

| | Physical properties of film after stretching | | | | | | | | |
|---|---|---|---|---|---|---|---|---|---|
| | | | | | | | | Number of film defects | |
| | Film width mm | Thickness of center portion μm | Average thickness μm | R (589) nm | R (589) nonuniformity nm | Nz | Slow axis range Degrees | Automatic defect detector Defects/m² | Visual inspection Defects/m² |
| Example 1 | 1200 | 71 | 70 | 140 | ±2 | 0.99 | ±0.8 | 0.2 | 0 |
| Example 2 | 1200 | 70 | 69 | 140 | ±2 | 0.99 | ±0.6 | 0.1 | 0 |
| Example 3 | 1200 | 68 | 67 | 270 | ±2 | 0.98 | ±0.7 | 0.1 | 0 |

TABLE 1-continued

| | | | | | | | | | |
|---|---|---|---|---|---|---|---|---|---|
| Example 4 | 1100 | 62 | 61 | 570 | ±3 | 1.00 | ±0.3 | 0.1 | 0 |
| Example 5 | 1200 | 40 | 39 | 138 | ±2 | 0.99 | ±0.7 | 0.3 | 0 |
| Example 6 | 1200 | 37 | 36 | 270 | ±2 | 1.00 | ±0.6 | 0.2 | 0 |
| Example 7 | 1000 | 33 | 32 | 569 | ±3 | 0.99 | ±0.3 | 0.3 | 0 |
| Example 8 | 1200 | 71 | 70 | 140 | ±2 | 0.99 | ±0.7 | 0.2 | 0 |
| Example 9 | 1330 | 71 | 70 | 138 | ±2 | 0.99 | ±0.6 | 0.1 | 0 |
| Example 10 | 1330 | 71 | 70 | 123 | ±1.5 | 1.00 | ±0.4 | 0.1 | 0 |
| Comparative Example 1 | 1200 | 70 | 69 | 136 | ±7 | 0.99 | ±1.5 | 0.1 | 0 |
| Comparative Example 2 | 1200 | 72 | 71 | 140 | ±2 | 1.01 | ±0.6 | 12 | 8 |
| Comparative Example 3 | 1200 | 71 | 70 | 139 | ±8 | 0.99 | ±0.9 | 0.1 | 0 |

EFFECT OF THE INVENTION

According to the present invention, there is provided a polycarbonate retardation film by melt extrusion. The film meets very strict requirements for a retardation film such as the absence of foreign matter, defects and small retardation nonuniformity. The film is industrially useful as an excellent film which has high productivity and is inexpensive and ecological without using a halogen-based solvent.

The invention claimed is:

1. A retardation film obtained by stretching and orienting a melt extruded film of a polycarbonate, wherein
   (1) the polycarbonate constituting the film has a viscosity average molecular weight of $1.3 \times 10^4$ to $1.8 \times 10^4$;
   (2) a retardation R(589) within a plane of the film measured at a wavelength of 589 nm is 50 to 800 nm;
   (3) a retardation R(589) nonuniformity within the plane of the film is ±5 nm;
   (4) an average thickness of the film is 10 to 150 μm; and
   (5) a number of film defects as large as 100 μm or more is 2 or less/m²,
   wherein bisphenol A is contained in an amount of not less than 50 mol % of a total of all bisphenol components of the polycarbonate.

2. The retardation film according to claim 1 which has a width of 500 to 2,000 mm.

3. The retardation film according to claim 1 which is obtained by stretching a melt extruded unstretched film in a longitudinal direction.

4. The retardation film according to claim 1 which is obtained by stretching in a longitudinal direction an unstretched film whose thickness nonuniformity (Tc/Te) in a width direction satisfies the following expression:

$$1.02 < Tc/Te < 1.10$$

wherein Tc is a thickness of a center portion of the film and Te is thicknesses of end portions of the film.

5. A method of producing the retardation film of claim 1, comprising the steps of:
   (i) melt extruding a polycarbonate having a viscosity average molecular weight of $1.3 \times 10^4$ to $1.8 \times 10^4$ to obtain an unstretched film which satisfies the following expression:

$$1.02 < Tc/Te < 1.10$$

wherein Tc is a thickness of a center portion of the film and Te is thicknesses of end portions of the film; and
   (ii) stretching the unstretched film in a longitudinal direction.

6. The retardation film according to claim 1 which is used as a λ/4 film which is one of the members constituting a circularly polarizing plate for 3-D polarizing spectacles.

7. The retardation film according to claim 2 which is obtained by stretching a melt extruded unstretched film in a longitudinal direction.

8. The retardation film according to claim 2 which is obtained by stretching in a longitudinal direction an unstretched film whose thickness nonuniformity (Tc/Te) in a width direction satisfies the following expression:

$$1.02 < Tc/Te < 1.10$$

wherein Tc is a thickness of a center portion of the film and Te is thicknesses of end portions of the film.

9. The retardation film according to claim 3 which is obtained by stretching in a longitudinal direction an unstretched film whose thickness nonuniformity (Tc/Te) in a width direction satisfies the following expression:

$$1.02 < Tc/Te < 1.10$$

wherein Tc is a thickness of a center portion of the film and Te is thicknesses of end portions of the film.

10. The retardation film according to claim 2 which is used as a λ/4 film which is one of the members constituting a circularly polarizing plate for 3-D polarizing spectacles.

11. The retardation film according to claim 3 which is used as a λ/4 film which is one of the members constituting a circularly polarizing plate for 3-D polarizing spectacles.

12. The retardation film according to claim 4 which is used as a λ/4 film which is one of the members constituting a circularly polarizing plate for 3-D polarizing spectacles.

* * * * *